United States Patent [19]
Reske et al.

[11] 3,894,995

[45] July 15, 1975

[54] TRANSPARENT POLYAMIDES FROM AN ISOMERIC MIXTURE OF NORBORNANES

[75] Inventors: Eckart Reske, Hofheim, Taunus; Ludwig Brinkmann, Frankfurt am Main; Hartmut Fischer, Kelkheim, Taunus; Freimund Rohrscheid, Frankfurt am Main, all of Germany

[73] Assignee: Hoechst Aktiengesellschaft, Frankfurt am Main, Germany

[22] Filed: Dec. 26, 1972

[21] Appl. No.: 317,943

[52] U.S. Cl............. 260/78 R; 260/33.4 P; 260/65; 260/78 A; 260/78 L; 260/563 P
[51] Int. Cl.......................................... C08g 20/20
[58] Field of Search............... 260/78 R, 78 L, 78 A

[56] References Cited
UNITED STATES PATENTS

| | | | |
|---|---|---|---|
| 3,301,827 | 1/1967 | Martin | 260/78 R |
| 3,787,371 | 1/1974 | Brinkmann et al. | 260/78 R |

*Primary Examiner*—Harold D. Anderson
*Attorney, Agent, or Firm*—Curtis, Morris & Safford

[57] ABSTRACT

Transparent polyamides are produced by polycondensing mixtures of isomeric amino-methyl aminopropyl norbornanes or mixtures thereof with aliphatic, cycloaliphatic, aromatic or aromatic aliphatic diamines and aliphatic, cycloaliphatic or aromatic dicarboxylic acids or mixtures of the said dicarboxylic acids with amino carboxylic acids.

12 Claims, No Drawings

TRANSPARENT POLYAMIDES FROM AN ISOMERIC MIXTURE OF NORBORNANES

The present invention relates to transparent polyamides and to a process for their preparation.

Polyamides prepared from aliphatic diamines and dicarboxylic acids have been known for a long time. Numerous polyamides are crystalline. The crystalline products cannot be used anywhere where transparency is necessary. Other polyamides are amorphous. Their melting point is relatively low and they have low second order transition temperatures. These polyamides lend themselves well to sheets, strips, plates, tubes, wire coverings and to various injection molding articles. However, they can only be used at low temperatures on account of their low second order transition temperatures, which, greatly limits their usefulness.

A process for the preparation of polyamides by polycondensation of diamines and dicarboxylic acids or their amideforming derivatives in the known way and under the usual conditions has now been found, which comprises using:

a. mixtures of isomeric amino-methyl-aminopropyl-norbornanes of the formulae

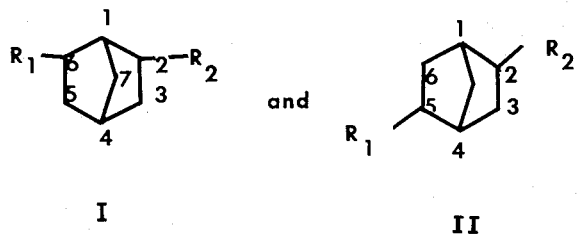

in which $R_1$ is an amino methyl-($NH_2$—$CH_2$)-radical and $R_2$ a 1-aminopropyl-2-$\left(-CH\begin{matrix}CH_3\\CH_2NH_2\end{matrix}\right)$-radical or a 3-aminopropyl-1-(—$CH_2$—$CH_2$—$CH_2NH_2$)-radical, or mixtures of the isomeric diamines named with one or several further diamine(s), these being aliphatic or cycloaliphatic diamine(s) with 2 to 20, preferably 2 to 12, carbon atoms or aromatic diamine(s) with 6 to 20, preferably 6 to 15, carbon atoms, above all mononuclear diamine(s) of the benzene series, or aromatic aliphatic diamine(s) with 7 to 20 carbon atoms and b. one of several dicarboxylic acid(s), these being aliphatic or cylcoaliphatic dicarboxylic acid(s) with 2 to 20, preferably 2 to 12, carbon atoms, or aromatic dicarboxylic acid(s) with 7 to 20, preferably 8 to 15, carbon atoms, above all mononuclear dicarboxylic acid(s) of the benzene series, or mixtures of the dicarboxylic acids named with one or several aminocarboxylic acid(s) with 2 to 20, preferably 2 to 12, carbon atoms, above all ω-aminocarboxylic acid(s) or (their) lactam(s)

The mixture of isomeric diamines of the formulae I and II (aminomethyl-aminopropyl-norbornanes, bis-(aminomethyl)-2-ethyl norbonanes) required for the preparation of the polyamides of the invention can be prepared from the inexpensive starting materials by hydroformylation of diolefins in the presence of rhodium or cobalt in finely distributed form or compounds of rhodium or cobalt in the known manner and subsequent catalytic-reductive amination of the mixture of dialdehydes obtained. As diolefin 2-vinyl- or 2-ethylidene-norbornene-5 or a mixture of these diolefins is used, and the catalytic reductive amination is carried out in such a way that ammonia, hydrogen, catalyst and optionally a solvent are introduced into the high-pressure vessel and only when the reaction temperature is reached the dialdehydes are pumped in while stirring, quickly enough for them to be immediately reductively aminated.

The reactions taking place when starting with 2-vinyl-norbornene-5 (formula III) or 2-ethylidene-norbornen-5(Formula IV

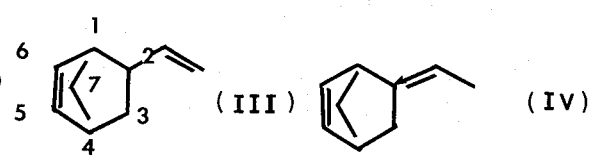

are illustrated as follows, using a compound of formula III

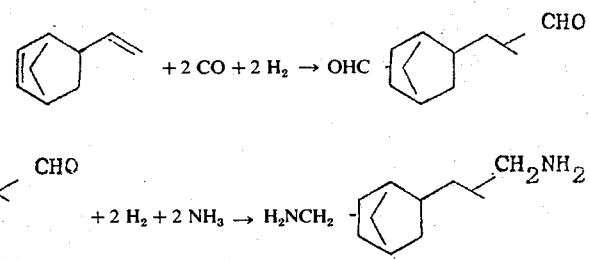

Mixtures of 4 isomeric aminomethylaminopropylnor-bornanes of the general formulae

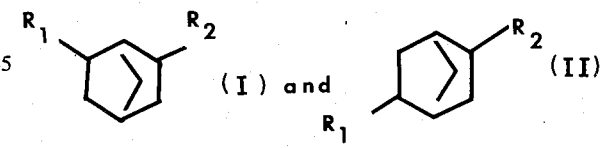

are obtained, wherein $R_1$ and $R_2$ have the above-defined meaning.

It has been found by gas chromatographic analysis that when using 2-ethylidene-norbornene-5 the same mixtures of diamines are obtained as when using 2-vinyl-norbornene-5, ie. 2-vinyl-norbornene-5 is formed at the beginning of the reaction from 2-ethylidene-norbornene-5 by isomerization.

Vinylnorbornene(formula III) is easily accessible from cyclopentadiene and butadiene by Diels-Alder-Synthesis. Ethylidene norbornene (Formula IV) can be obtained likewise in the known way from vinylnorbornene through isomerization of the double bond of the vinyl group.

The hydroformylization of these two compounds with a mixture of $CO + H_2$ (synthesis gas) can be carried out in the known way in the presence or absence of a solvent at a temperature of from 100° to 180°C and at a pressure of from 100 to 1,000 atmospheres gauge or more. When using cobalt catalyst the reaction should preferably be carried out at a temperature of from 140° to 170°C and at a pressure of from 150 to 400 atmospheres gauge; for rhodium catalysts ranges of from 110° to 140°C and 150 to 600 atmospheres gauge are advantageous.

Aliphatic or aromatic hydrocarbons are especially suitable as solvents; preferably mononuclear aromatic hydrocarbons such as benzene or toluene are used.

Catalysts suitable for the reaction are the carbonyls of rhodium and cobalt, carbonyl forming compounds of these metals or the elements in finely distributed form. Carbonyl-forming compounds of rhodium which are preferred are dirhodiumtrioxide and the Rh-salts of weak acids such as acetic acid or 2-ethylhexanoic acid. The rhodium concentration can vary between $10^{-6}$ and $10^{-2}$ g-atom rhodium/mol diolefin, the preferred range being between $10^{-5}$ and $10^{-4}$ g-atoms Rh/mol diolefin. The cobalt concentration can be between $10^{-3}$ and $10^{-1}$ g-atom CO/mol diolefin, the preferred range being $5 \cdot 10^{-3}$ to $10^{-2}$ g-atom CO/mol diolefin.

Rhodium carbonyl compounds are preferable as catalysts because in comparison to the corresponding compounds of cobalt they produce a better yield of dialdehydes at considerably lower catalyst concentrations.

The working up of the dialdehydes takes place expediently by film distillation at pressures of under 40 mm Hg, preferably under 10 mm Hg, and heating jacket temperatures of up to 200°C.

Dialdehydes condense very easily with ammonia into polymeric products. Also the dialdehydes obtained from vinylnorbornene or ethylidene norbornene react under conditions with which no hydrogenation occurs, for example because the temperature is too low, with ammonia to polymeric solid products which subsequently cannot be converted into diamines any longer. These useless condensation products occur even at temperatures below 0°C.

The process described above and in the following makes it possible to convert the dialdehydes nevertheless with good yields into the isomeric aminomethylaminopropyl-norbornanes. The catalytic-reductive amination is carried out in such a way that ammonia, hydrogen, catalyst and optionally a solvent are placed in the high pressure vessel and at the reaction temperature the dialdehydes are pumped in while stirring, at a rate so that they are aminated reductively immediately.

The reaction is carried out expediently at temperatures of from 100° to 160°C, preferably 120° to 150°C. The hydrogen pressure in the reaction vessel is set at room temperature at 100 to 180 atmospheres gauge; during the heating the pressure increases considerably; when the reaction temperature has been attained, a total pressure of 200 to 320 atmospheres gauge is reached.

Nickel or cobalt are used as hydrogenation catalysts, either in the form of Raney-nickel or Raney cobalt or applied on carriers. Preferably a catalyst containing approx. 45% cobalt on kieselguhr is used.

Ammonia should be used in excess; per mol of formyl group preferably at least 2 mols of ammonia are necessary, more preferably 4 to 5 mols of ammonia are used.

The reduction amination of the dialdehydes can be carried out without special solvents, possibly the end product itself can be used as solvent. In the case of small discontinuous batches it is, however, advantageous to work in suitable solvents. Especially good results are obtained when using tetrahydrofurane, isobutanol, butanol and isopropanol as solvents.

The mixture of the isomeric diamines is obtained in good yields, only a small part of the dialdehydes is converted into higher molecular condensation products. These condensation products are solids, but fluid, under the specified conditions and reaction mixture, which is very advantageous for a simple product withdrawal from the reactor and a working up of the raw products by film distillation without interruptions. After the film distillation the product is rectified on a column. The isomeric mixture of the aminomethyl-aminopropyl-norbornanes is a colorless liquid which boils at 12 mm Hg at 150° to 151°C. The compounds are miscible with water at room temperature in any proportion, the elementary analysis confirms the composition $C_{11}H_{22}N_2$.

The mixtures of the isomeric diamines of the invention according to the formulae I and II are valuable compounds and can be used, for example, as hardeners for epoxy resins or can be further processed after conversion into the corresponding di-isocyanates to polyurethanes. In particular they can be transformed, optionally together with further diamines by polycondensation with one or several aliphatic and/or cycloaliphatic and/or aromatic dicarboxylic acids directly into polyamides, which are distinguished by transparency and high second order transition temperatures and are especially suitable for treatment by injection molding.

In the preparation of the polyamides of the invention further diamines may be added to the mixture of the bis-(aminomethyl)-2-ethylnorbornanes these being:

c. aliphatic diamines with 2 to 20 carbon atoms and cycloaliphatic diamines; above all compounds of the general formula

$$NH_2 — (CH_2)_m — NH_2$$

are suitable as aliphatic diamines, wherein m is an integer of from 2 to 12; the stereoisomeric 1,3- and 1,4-bis-aminomethyl-cyclohexanes, trans-1,2-bis-aminomethyl-cyclo-butane-cyclopentane and -cyclohexane are suitable as cyclo-aliphatic diamines. Especially suitable are ethylene diamine, hexamethylene diamine and 2-methyl-pentamethylene diamine.

d. aromatic diamines with 6 to 20, preferably 6 to 15 carbon atoms, above all mononuclear diamines of the benzene series, 4,4'-, 3,4'- and 3,3'-diamino-diphenyl and other diamino-diphenyls, diamino-diphenylmethanes, diamino-diphenyl ethers and diaminodiphenyl-sulfones, especially m- and p-phenylene diamines.

e. aromatic-aliphatic diamines with 7 to 20 carbon atoms and those of the general formula

$$NH_2—R—Ar—R—NH_2,$$

wherein R signifies a simple chemical bond or identical or different alkylene groups with 1 to 8 carbon atoms and Ar is a bivalent aromatic, optionally alkyl-substituted radical, for example m- and p-xylylene-diamine, 2,5-dimethyl-p-xylylene-diamine and 2,4-dimethyl-m-xylylene-diamine.

Mixtures of the diamines named in c) to e) can also be used. The maximum quantity of diamines, which can be incorporated by condensation without the polyamide losing its transparency, depends on the number of the diamines added and on their nature.

Aliphatic diamines with branched carbon structure, as well as diamines of which the carbon structure contains one or several cycloaliphatic radicals, can be incorporated by condensation in greater quantity than those with straight-chain or aromatic carbon structure. Furthermore, a mixture of various diamines can be incorporated by condensation in greater quantity than a single diamine.

In general it is possible to add up to 80 mol-%, preferably up to 50 mol-% (calculated on the total diamine mixture), of the diamines named in (c) to (e), without the polyamide losing its transparency.

Suitable dicarboxylic acids are aliphatic, cycloaliphatic and aromatic dicarboxylic acids. As aliphatic dicarboxylic acids preferably acids with 2 to 20 carbon atoms are used and more preferably there are used compounds of the general formula $$HOOC - (CH_2)_n - COOH,$$

in which n is 0 or an integer from 1 to 10. Cycloalipahtic dicarboxylic acids which are preferably used are the stereoisomeric 1,3-cyclopentanedicarboxylic acids, 1,3- and 1,4-cyclohexanedicarboxylic acids and 4,4'-dicyclohexyl-dicarboxylic acid. Especially suitable is adipic acid.

As aromatic dicarboxylic acids those with 7 to 20, preferably 8 to 15 carbon atoms can be used, above all mononuclear dicarboxylic acids of the benzene series. Terephthalic acid and isophthalic acid are especially suitable. Further advantageous examples are 3,5-pyridinedicarboxylic acid, 1,4-, 1,5- and other naphthalene-dicarboxylic acids, 4,4'-diphenyl-dicarboxylic acid, diphenylsulfonedicarboxylic acids and benzophenonedicarboxylic acids.

As amino-carboxylic acids those with 2 to 20 carbon atoms can be added, above all compounds with the general formula $$NH_2 - (CH_2)_p - COOH$$

$(p = 1 \text{ to } 11),$ especially amino-pivalic acids, ε-amino-caproic acid and ω-aminododecanoic acid.

Also aromatic or aliphatic-aromatic amino-carboxylic acids of the formula $$NH_2 - R' - Ar - COOH,$$

wherein R' is a simple chemical bond or an alkylene group with 1 to 8 carbon atoms and Ar is a bivalent, aromatic radical, which may be substituted by alkyl; m- and p-amino-benzoic acids are especially preferred.

Mixtures of two or more of the dicarboxylic or amino carboxylic acids named can be also used.

The maximum quantity of amino-carboxylic acids, which can be incorporated by condensation without the polyamide losing its transparency depends on the number of amino-carboxylic acids added and their nature.

Aliphatic amino-carboxylic acids with branched carbon structure and also amino-carboxylic acids, of which the carbon structure contains one or several cycloaliphatic radicals can be incorporated by condensation in greater quantity than those with straight-chain or aromatic carbon structure. Furthermore, a mixture of various amino-carboxylic acids can be incorporated by condensation in greater quantity than an individual aminocarboxylic acid.

In general it is possible to add up to 70 per cent by weight, preferably up to 50 per cent by weight (calculated on the total mixture of the starting materials) of amino-carboxylic acids, without the polyamide losing its transparency.

The polyamides of the invention can be prepared in the known way by melt condensation.

The diamine mixture and the dicarboxylic acid(s) in the stoichiometric quantities or in approximately stoichiometric quantities are put in an autoclave with stirrer possibly with the addition of water and/or acetic acid, or also the salt(s) of the diamine(s) and the dicarboxylic acid(s) and optionally an addition of amino-carboxylic acids(s) or its/their lactams, the mixture is melted, the steam is drawn off after some time, the mixture is stirred for some time in an inert gas stream and then condensed further in the vacuum, until the desired molecular weight is obtained.

The reduced specific viscosities of the polyamides should be between 0.8 dl/g and 3 dl/g (measured with solutions of 1 g of polyamide in 100 ml of phenol-tetrachlorethane (3+2 parts by weight) at 25°C), preferably between 1 dl/g and 2 dl/g.

In the melt condensation also amide-forming derivatives of the starting materials can be used; ie. in place of the dicarboxylic acids their esters or amides, in place of the diamines their amides or isocyanates, or in place of the amino-carboxylic acids their lactams.

A further mode of preparing the polyamides is to react the diamine mixture with dicarboxylic acid halides according to the process of interfacial or solvent condensation.

The polyamides of the invention are transparent and possess relatively high second order transition temperatures. The various components of the diamine mixture influence the properties of the polyamides in such a way that no crystallization takes place. On the other hand, the individual components of this diamine mixture, astonishingly, do not have the undesired effect of reducing the second order transition temperatures of the polyamides of the invention to too great an extent.

Some of the polyamides of the invention, become slightly cloudy by weak crystallization when they are cooled slowly from the melt. However, transparent molded articles are also obtained from them when they are cooled quickly to temperatures of below the glass temperature after the thermoplastic shaping has taken place, for example by injection molding with the aid of injection molding machines into cold forms.

The following Examples illustrate the invention

Preparation of the mixture of isomeric aminomethyl-aminopropylnorbornanes

EXAMPLE 1

A solution of 400 g (3.21 mols) of ethylidene norbornene in 800 ml of benzene, to which 0.2 mol of rhodium (III) octanoate had been added, was reacted in a 2-l-autoclave for 1 hour at 120° to 125°C with synthesis gas at a pressure of 450 atmospheres gauge. After cooling and withdrawing from the autoclave, the benzene was distilled off from the reaction solution in the falling-film evaporator at 150 mm Hg and 80°C jacket temperature.

The residue was again distilled at 160°C jacket temperature and 3 to 5 mm Hg over the falling-film evaporator. 430 g = 74.4% of the theor etical amount of the doubly formylated ethylnorbornane was passed over.

EXAMPLE 2

The repetition of example 1 with 400 g of vinylnorborne instead of ethylidene norbornene yielded under the same conditions 456 g = 79 % of the theoretical amount of doubly formylated ethylnorbornane.

The gaschromatographic analysis showed that there was no noticeable difference in the composition of the products which had formed from vinyl norbornene (Example 2) or ethylidene norbornene (Example 1)

EXAMPLE 3

A high pressure vessel of 2 l content was loaded with 204 g (12 mols) of ammonia, 200 ml of tetrahydrofurane and 20 g of Raney-Nickel. Hydrogen was forced in up to a pressure of approx. 100 atmospheres gauge and the mixture was heated to 135°C. When this temperature was reached hydrogen was forced in and a total pressure of 280 atmospheres gauge was set. Over a high pressure dosage pump 270 g (1.5 mols) of bisformylethylnorbornane mixture obtained according to Example 1 were pumped into the reaction vessel within 1 hour. The mixture was left to react for 30 minutes and then cooled immediately. After cooling and releasing pressure of the excess hydrogen the product taken from the reaction vessel was filtered. Subsequently the remaining ammonia and the solvent were removed. The remaining raw product was distilled at approx. 1 mm Hg and 140°C jacket temperature over a falling-film evaporator, the distillate obtained in this way was subsequently fractionated over a silver jacket column. The main fraction at $bp_{12} = 150°$ to $151°C$ was obtained after short first runnings.

Yield: 210 g (1.15 mols), corresponding to 77% of the theoretical amount. The mixture of the isomeric a-minomethyl-aminopropylnorbornanes is a colorless liquid which is miscible with water in every proportion.

EXAMPLE 4

A high pressure vessel of 5 l content was fed with 510 g (30 mols) of ammonia, 500 ml of isobutanol and 50 g of a catalyst, which contained 45% cobalt kieselguhr. After introducing hydrogen to increase the pressure to approx. 100 atmospheres the mixture was heated to 150°C; when this temperature was reached a total pressure of 250 atmospheres was established by further introduction of hydrogen.

Using a high pressure dosage pump 540 g (3 mols) of bisformylethylnorbornane mixture obtained according to Example 2 were pumped into the reaction vessel within 1.5 hours. The mixture was left to react for a further 15 minutes and then cooled immediately The batch was worked up as described in Example 3.

The fractionated distillate yielded 431 g (2,37 mols) of a mixture of isomeric aminomethyl-aminopropylnorbornanes ie. 79% of the theoretical amount.

Preparation of the polyamides

EXAMPLE 5

For the preparation of the salt 182.3 g of the mixture of bis-aminomethyl-2-ethylnorbornanes, 166.1 g of terephthalic acid and 2 l of ethanol were heated for 1 hour to boiling, water was added slowly until a clear solution was obtained, the solvent was drawn off in the water jet vacuum and dried for 12 hours in the drying chamber.

For poly-condensation the salt was introduced into an autoclave, the air was displaced with nitrogen, the autoclave was evacuated and sealed. The salt was melted at 280°C, stirred for 30 minutes at this temperature, the pressure was released in the course of 1 hour, nitrogen was passed through the apparatus and the melt stirred for 1 hour. Subsequently the pressure was reduced to 0.1 mm of mercury and the melt was stirred for 1 hour at 280°C. The polyamide obtained was transparent and had a reduced specific viscosity of 1.4 dl/g and its second order transition temperature was 201°C.

EXAMPLE 6

As described in Example 5 from 182.3 g of the diamine mixture and 166.1 g of isophthalic acid the salt was prepared and condensed at 280°C.

The polyamide obtained was transparent and had a reduced specific viscosity of 1.3 dl/g and a second order transition temperature of 186°C

EXAMPLE 7

As described in Example 5, the salt was prepared from 182,3 g of the diamine mixture and 146.1 g of adipic acid and condensed at 280°C. the polyamide obtained was transparent and had a reduced specific viscosity of 1.6 dl/g and a second order transition temperature of 117°C.

EXAMPLE 8

As described in Example 5, two salts were prepared separately from:

A: 182.3 g of the diamine mixture and 166.1 g of terephthalic acid;

B: 116.2 g of 2-methylpentamethylene diamine and 166.1 g of terephthalic acid.

200 g of salt A and 100 g of salt B are mixed together and, as described in Example 5, condensed at 280°C The polyamide obtained was transparent and has a reduced specific viscosity of 1.1 dl/g and a second order transition temperature of 180°C.

EXAMPLE 9

200 g of the salt prepared according to Example 5 from the diamine mixture and terephthalic acid were mixed with 50 g of ε-caprolactam and, as described in Example 5, polycondensed at 280°C.

The polyamide obtained was transparent and had a reduced specific viscosity of 1.6 dl/g and a second order transition temperature of 171°C.

What is claimed is:

1. A polyamide consisting essentially of the polymeric condensation product of a. a mixture of isomeric norbornanes of the formulae

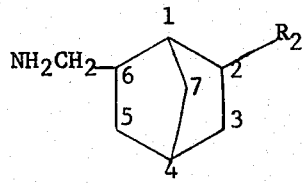 and 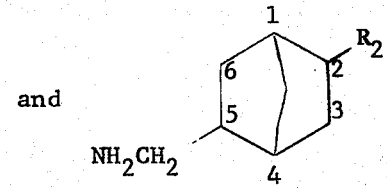

in which $R_2$ is $-CH(CH_3)CH_2NH_2$ or $-CH_2CH_2CH_2NH_2$, and b. a mixture of terephthalic acid with up to 70% by weight, based on the total weight of reactants, of ε-caprolactam, said polyamide having a reduced specific viscosity of 0.8 dl/g to 3 dl/g measured at a concentration of 1 gram of polyamide in 100 ml of phenol-tetrachloroethane at a 3:2 weight ratio and at 25°C.

2. A polyamide consisting essentially of the polymeric condensation product of
   a. a mixture of isomeric aminomethyl-aminopropyl norbornanes of the formulae

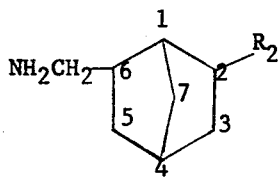 and 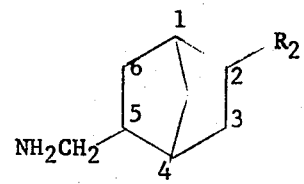

in which $R_2$ is $-CH(CH_3)CH_2NH_2$ or $-CH_2CH_2CH_2NH_2$, or a mixture of said isomeric norbornanes and up to 80 mole percent of at least one branched chain aliphatic diamine of 2 to 20 carbon atoms and
   b. at least one dicarboxylic acid which is an aromatic carbocyclic dicarboxylic acid of 8 to 20 carbon atoms, or an aliphatic dicarboxylic acid of 2 to 20 carbon atoms, or a mixture of said dicarboxylic acid and up to 70% by weight, based on the total weight of reactants, of at least one aminocarboxylic acid of 2 to 20 carbon atoms, or a lactam of said aminocarboxylic acid, said polyamide having a reduced specific viscosity of 0.8 dl/g to 3 dl/g measured at a concentration of 1 gram of polyamide in 100 ml of phenol-tetrachloroethane at 3:2 weight ratio and at 25°C.

3. A polyamide according to claim 2 wherein said aliphatic diamine is 2-methylpentamethylene diamine.

4. A polyamide according to claim 2 in which said dicarboxylic acid is terephthalic acid, isophthalic acid, adipic acid or a mixture of these acids.

5. A polyamide according to claim 2 wherein component (b) is a mixture of dicarboxylic acid and lactam and the lactam is ε-caprolactam.

6. A polyamide according to claim 2 wherein component (a) is said mixture of isomeric aminomethyl-aminopropyl norbornanes and component (b) is terephthalic acid.

7. A polyamide according to claim 2 wherein component (a) is said mixture of isomeric aminomethyl-aminopropyl norbornanes and component (b) is isophthalic acid.

8. A polyamide according to claim 2 wherein component (a) is a mixture of said isomeric aminomethyl-aminopropyl norbornanes and component (b) is adipic acid.

9. A polyamide consisting essentially of the polycondensation product of
   a. a mixture of isomeric aminomethyl-aminopropyl norbornanes of the formulae

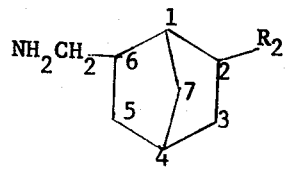 and 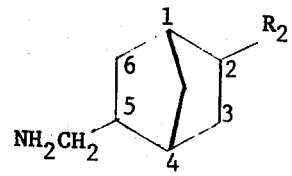

in which $R_2$ is $-CH(CH_3)CH_2NH_2$ or $-CH_2CH_2CH_2NH_2$, and
   b. at least one aromatic carbocyclic dicarboxylic acid of 8 to 20 carbon atoms and from 0 to 70% by weight, based on the total weight of reactants, of an aminocarboxylic acid of 2 to 20 carbon atoms or a lactam thereof, said polyamide having a reduced specific viscosity of 0.8 dl/g to 3 dl/g measured at a concentration of 1 gram of polyamide in 100 ml of phenol-tetrachloroethane at a 3:2 weight ratio and at 25°C.

10. A polyamide according to claim 9 wherein component (b) is terephthalic acid.

11. A polyamide according to claim 9 wherein component (b) is isophthalic acid.

12. A polyamide according to claim 9 wherein component (b) is a mixture of terephthalic acid and ε-caprolactam.

* * * * *